United States Patent
Shirakawa

(10) Patent No.: US 6,325,548 B1
(45) Date of Patent: Dec. 4, 2001

(54) OPTICAL FIBER-FIXING STRUCTURE OF FERRULE FOR PROVISIONALLY FITTING AN OPTICAL FIBER

(75) Inventor: Tsuguhito Shirakawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/354,159

(22) Filed: Jul. 16, 1999

(30) Foreign Application Priority Data

Jul. 31, 1998 (JP) .................................. 10-217363

(51) Int. Cl.$^7$ ...................................... G02B 6/36
(52) U.S. Cl. ................... 385/78; 385/60; 385/66; 385/81
(58) Field of Search ................. 385/60, 62, 65, 385/66, 72, 76, 78, 80, 84, 81, 83

(56) References Cited

U.S. PATENT DOCUMENTS

| | | | |
|---|---|---|---|
| 4,696,537 | 9/1987 | Bauer et al. ................ | 350/96.2 |
| 4,869,572 | * 9/1989 | Despouys ................... | 350/96.21 |
| 5,071,218 | * 12/1991 | Nishimoto .................. | 385/60 |
| 5,146,523 | * 9/1992 | Maillot ...................... | 385/60 |
| 5,230,032 | * 7/1993 | Muzslay ..................... | 385/66 |
| 5,554,068 | * 9/1996 | Carr et al. .................. | 451/468 |
| 5,852,694 | * 12/1998 | Kimura et al. .............. | 385/78 |
| 5,862,280 | * 1/1999 | Tanaka et al. .............. | 385/78 |

FOREIGN PATENT DOCUMENTS

| | | | |
|---|---|---|---|
| 44 10 444 C2 | 9/1995 | (DE) | .............. G02B/6/38 |
| 0 735 391 | 10/1996 | (EP) | .............. G02B/6/38 |
| 0 784 219 | 7/1997 | (EP) | .............. G02B/6/38 |
| 2 040 062 | 8/1980 | (GB) | .............. G02B/7/26 |
| 0 803 751 | 10/1997 | (GB) | .............. G02B/6/38 |
| 60-115210 | 8/1985 | (JP) | .............. G02B/6/36 |
| 62-255096 | 11/1987 | (JP) | .............. B26D/3/16 |
| 6-69912 | 9/1994 | (JP) | .............. G02B/6/36 |

* cited by examiner

*Primary Examiner*—John D. Lee
*Assistant Examiner*—Jennifer Doan
(74) *Attorney, Agent, or Firm*—Sughrue, Mion, Zinn, Macpeak & Seas, PLLC

(57) ABSTRACT

An optical fiber-fixing structure of a ferrule is provided. The ferrule is fitted on an optical fiber having a conductor exposed from a sheath by an end processing, so that the ferrule is bonded and fixed to the optical fiber. The ferrule includes a larger inner-diameter and a smaller inner-diameter receiving portion for respectively receiving the sheath and the conductor, and the receiving portions extend continuously through the ferrule from one end to the other end. Grooves and protuberances are formed at the larger inner-diameter receiving portion. The protuberances provide a reduced inner diameter, being defined by distal ends of the protuberances, which is smaller than that of the sheath of the optical fiber, so that the sheath is provisionally fixed relative to the receiving portion in a press-fitted condition.

5 Claims, 4 Drawing Sheets

OPTICAL FIBER-FIXING STRUCTURE OF FERRULE FOR PROVISIONALLY FITTING AN OPTICAL FIBER

BACKGROUND OF THE INVENTION

1. Field of the Invention

This invention relates to an optical fiber-fixing structure of a ferrule, and more particularly, to an improved optical fiber-fixing structure of a ferrule in which a sheath of an optical fiber is provisionally fixed in a press-fitted condition.

2. Related Art

An optical communication structure has heretofore been used for transmitting a large quantity of information such as voice, images and data pulses. In the optical communication structure, usually, an electrical signal is converted into light, and this light is propagated through an optical fiber and emerges to be again converted into an electrical signal, and by doing so, a large amount of information is transmitted.

In the optical communication structure, various kinds of optical connectors are used for connecting the optical fibers together and for connection to a receptacle having a light-emitting element.

An optical connector includes an optical fiber, subjected to an end processing, a ferrule mounted on an end portion of the optical fiber, and a housing for receiving the optical fiber and ferrule. The optical fiber and the ferrule comprise the following members.

As shown in FIG. 3, the optical fiber 1 comprises a conductor 2 of a circular cross-section consisting of a core and a clad, and primary and secondary sheaths (often referred to as "jacket") 3 and 4 formed in layers on an outer peripheral surface of the conductor 2.

In the drawings, the optical fiber is subjected to an end processing by which predetermined lengths of the sheaths are peeled and removed from the end portion, so that the conductor 2 and the primary sheath 3 are exposed.

A ferrule 5, which is to be mounted on the optical fiber 1 subjected to the above end processing, is made of a synthetic resin, and is formed into a generally stepped, cylindrical shape. The ferrule 5 includes two receiving portions 6 and 7 for respectively receiving the primary sheath 3 and the conductor 2, wherein the receiving portion 6 has a larger inner diameter than the receiving portion 7.

The receiving portions 6 and 7 are coaxial with each other, and extend continuously through the ferrule 5 from one end 5a thereof to the other end 5b thereof. A tapering surface 7a is formed at a portion of the receiving portion 7 that is connected to the receiving portion 6.

The length of the receiving portion 6 in a direction of a longitudinal axis thereof (i.e., along the direction of the center axis of the ferrule 5) is equal to the length of the exposed primary sheath 3, and the length of the receiving portion 7 in a direction of a longitudinal axis thereof is equal to the exposed conductor 2.

An inner diameter D1 of the receiving portion 6 is slightly larger than an outer diameter D2 of the primary sheath 3 so as to provide an insertion clearance.

An annular flange 5c for engagement with the above-mentioned housing (not shown) is formed on a generally central portion of the outer peripheral surface of the ferrule 5, and projects perpendicularly to the central axis of the ferrule, the annular flange 5c being formed on that portion of the ferrule 5 having the receiving portion. A similar flange 5d is also formed on the outer peripheral surface of the ferrule at the one end 5a thereof.

The optical fiber 1 and the ferrule 5, having the above respective constructions, are fixed together through the following steps.

First, an adhesive (not shown) is coated on that portion (indicated by the range H) of the optical fiber 1, extending from the distal end of the conductor 2 to the step portion between the primary and secondary sheaths 3 and 4, over an entire area thereof.

Then, the ferrule 5, being coated with the adhesive, is fitted into the optical fiber 1, through the one end 5a thereof, and is mounted thereon as shown in FIG. 4.

Then, the above adhesive is solidified by air drying or forced drying.

In the above conventional technique, the optical fiber 1 and the ferrule 5 are fixed together by the use of the adhesive, and therefore there is a possibility that the following situations occur before the adhesive is dried.

Firstly, the small insertion clearance (D1–D2, see FIG. 3) is formed between the receiving portion 6 and the primary sheath 3, and therefore before the adhesive is completely dried, the ferrule 5 can be displaced out of position unless this assembly is handled carefully, particularly when being moved. (If the ferrule strikes against something, it may be disengaged from the optical fiber).

This careful handling adversely affects the efficiency of the operation, and therefore, naturally, it is not desirable to continue to use this step.

Even if the handling is performed carefully, it is still necessary to provide the step of checking whether or not the ferrule 5 has been displaced, and therefore the arrangement of personnel responsible for this checking step must be taken into consideration, and this further lowers the efficiency of the operation.

Therefore, there is still room for improvement for the manner and structure in which the optical fiber 1 and the ferrule 5 are fixed together.

A second point to be noted is the strength of fixing between the optical fiber 1 and the ferrule 5. The air included in the adhesive is not fully removed therefrom when the ferrule is mounted on the optical fiber, and when the adhesive is dried in this condition, there is provided, in some cases, a product in which the fixing strength is much lowered.

More specifically, the air, included in the adhesive, is formed into bubbles, and if many bubbles are disposed in contact with the bonding surface, the area of bonding is reduced by an amount corresponding to the number of these bubbles when the adhesive is dried, and as a result the fixing strength is lowered.

To deal with this, it may be proposed to form air vent holes through the peripheral wall of the ferrule 5. However, the bubbles are formed at random on the bonding surface, and therefore this is not a satisfactory countermeasure. In addition, since pins for forming the air vent holes are formed on a mold, the mold would have a complicated shape, and thus, is not practical.

Currently, the ferrule 5 is gradually mounted on the optical fiber while being rotated in directions of arrow P (FIG. 5) so as to remove the air.

However, this method is effective only when the above-mentioned clearance has a certain size, and this clearance (D1–D2) is generally small, and therefore the air cannot be satisfactorily removed from the adhesive.

Moreover, this method entails a very cumbersome operation, requiring much time, which lowers the efficiency of the operation.

SUMMARY OF INVENTION

With the above problems in view, it is an object of this invention to provide an optical fiber-fixing structure of a ferrule in which the efficiency of an operation, required for fixing an optical fiber and a ferrule together, is greatly enhanced.

The above object has been achieved by an optical fiber-fixing structure of a ferrule, wherein the ferrule is fitted on an optical fiber having a conductor exposed from a sheath by an end processing, and the ferrule includes two larger inner-diameter and smaller inner-diameter receiving portions for respectively receiving the sheath and the conductor, and the receiving portions extend continuously through the ferrule from one end thereof to the other end thereof, and the ferrule is bonded and fixed to the optical fiber. Protuberances are formed at the larger inner-diameter receiving portion, and an inner diameter, defined by distal ends of the protuberances, is smaller than a diameter of the sheath, and the sheath is provisionally fixed relative to the larger inner-diameter receiving portion in a press-fitted condition.

In this optical fiber-fixing structure of the ferrule, the ferrule is fitted on the optical fiber having the conductor exposed from the sheath by the end processing, and the ferrule includes the two larger inner-diameter and smaller inner-diameter receiving portions for respectively receiving the sheath and the conductor. The receiving portions extend continuously through the ferrule from one end thereof to the other end thereof, and the ferrule is bonded and fixed to the optical fiber. The protuberances are formed at the larger inner-diameter receiving portion, and the inner diameter, defined by the distal ends of the protuberances, is smaller than the diameter of the sheath, and the sheath is provisionally fixed relative to the larger inner-diameter receiving portion in a press-fitted condition.

In this optical fiber-fixing structure, when the ferrule is fitted on the optical fiber, the protuberances compress the sheath of the optical fiber radially inwardly, and therefore the ferrule will not be displaced with respect to the optical fiber, and the bond-fixing can be effected stably.

With this invention, it is not necessary to conduct the careful operation discussed above (which lowers the efficiency of the operation) that is required in the conventional construction before the bond-fixing between the ferrule and the optical fiber is completed. Also, a check for the displacement of the ferrule can be omitted or simplified.

Therefore, the above fixing structure can greatly enhance the efficiency of the operation required for fixing the optical fiber and the ferrule together.

Moreover, the number of the component parts is not increased, and therefore this structure is not only more efficient, but is more economical as well.

The term "bond-fixing" refers to the fixing of the ferrule to the optical fiber as a result of solidification of an adhesive.

In the optical fiber-fixing structure of the ferrule, the protuberances may extend in a direction of an axis of the larger inner-diameter receiving portion. With this construction, the protuberances, formed at the larger inner-diameter receiving portion, extend in the direction of the axis of this receiving portion. Therefore, the area of those portions, compressing the sheath of the optical fiber to hold the same, is large, and therefore these protuberances positively prevent the displacement of the ferrule, and contribute to the enhancement of the operation efficiency.

Also, grooves may be formed at the larger inner-diameter receiving portion, and extend in the direction of the axis of this receiving portion. With this construction, the grooves are formed at the larger inner-diameter receiving portion, and extend in the direction of the axis of this receiving portion. When these grooves are formed, the clearance for the optical fiber is larger at these grooves as compared with the conventional construction. Because of the provision of the protuberances, the adhesive, existing on those portions of the sheath, compressed by the protuberances, and on their neighboring portions, are moved toward the grooves. As a result, the air (bubbles), included in the adhesive, gather to form a large lump of the air, and the air can easily escape to the exterior partly under the influence of its buoyancy.

Therefore, the air can be removed without relying on the cumbersome conventional operation in which the ferrule, while rotated, is fitted on the optical fiber, and the efficiency of the operation can be markedly enhanced.

In addition, the number of the component parts is not increased, and therefore this structure is economical, as well as efficient.

Also, each of the grooves may have a generally semi-circular cross-section as viewed in a direction perpendicular to the axis. With this construction, each of the grooves, formed at the larger inner-diameter receiving portion, has a generally semi-circular cross-section as viewed in the direction perpendicular to the axis of this receiving portion. With this configuration, the adhesive is distributed uniformly over the entire area of each groove regardless of the viscosity of the adhesive. Therefore, fresh air layers will not be produced when the adhesive flows into the grooves, and therefore, the ferrule and the optical fiber can be bonded and fixed together more satisfactorily.

Also, a tapering portion may be formed at an edge of a bore of the larger inner-diameter receiving portion open to the one end of the ferrule, and decrease in diameter progressively from the one end toward the inside of the ferrule. With this construction, the tapering portion is formed at the edge of the bore of the larger inner-diameter receiving portion open to the one end of the ferrule, and decreases in diameter progressively from the one end toward the inside of the ferrule. Therefore, the sheath of the optical fiber is guided to the protuberances by this tapering portion, so that the ferrule can be easily press-fitted on the optical fiber, and the efficiency of the operation is, therefore, enhanced.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE INVENTION

Figure 1:
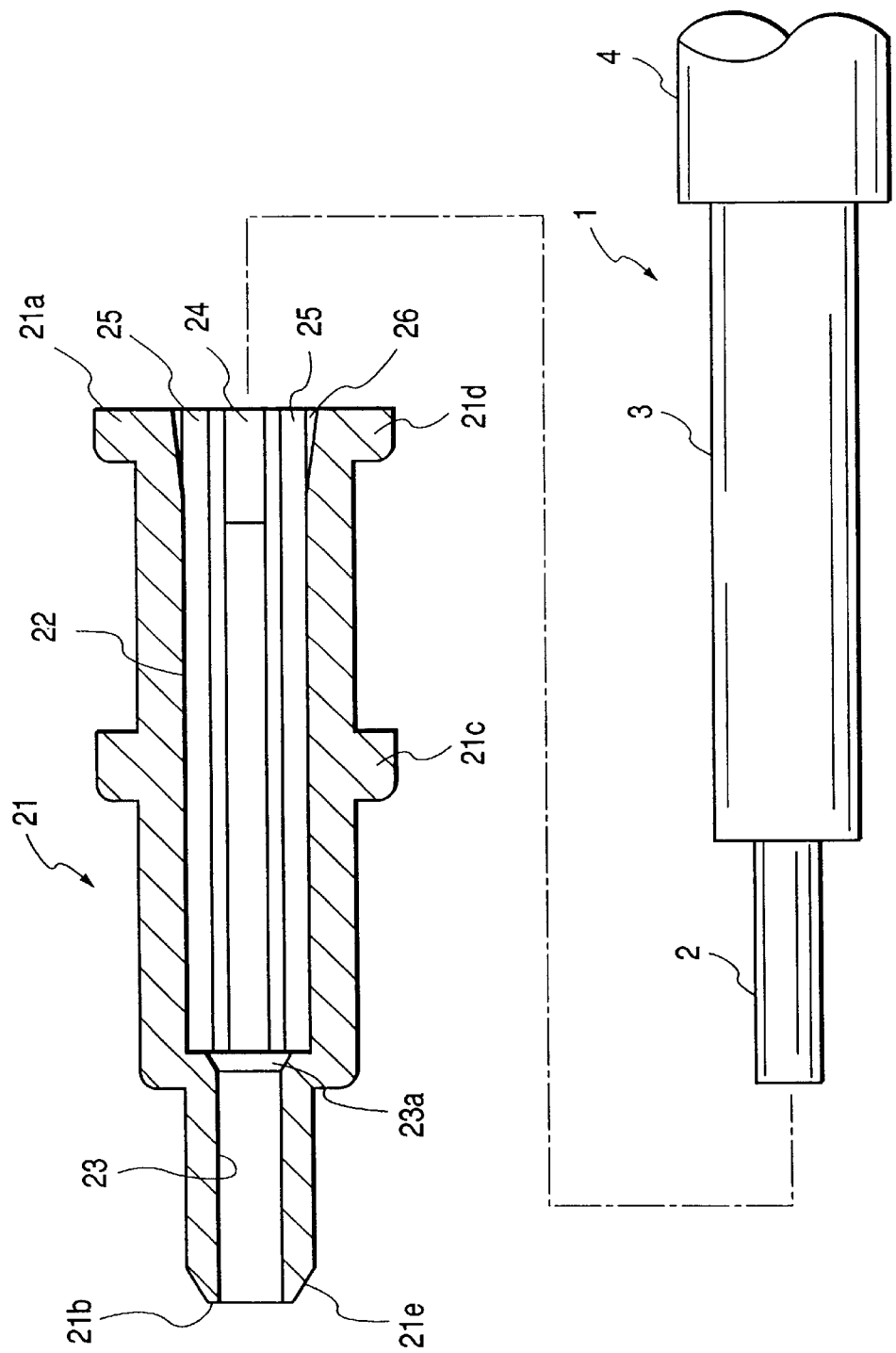
FIG. 1 shows one preferred embodiment of an optical fiber-fixing structure of a ferrule of the invention, showing a cross-sectional view of the ferrule and a plan view of an optical fiber.
Figure 2:
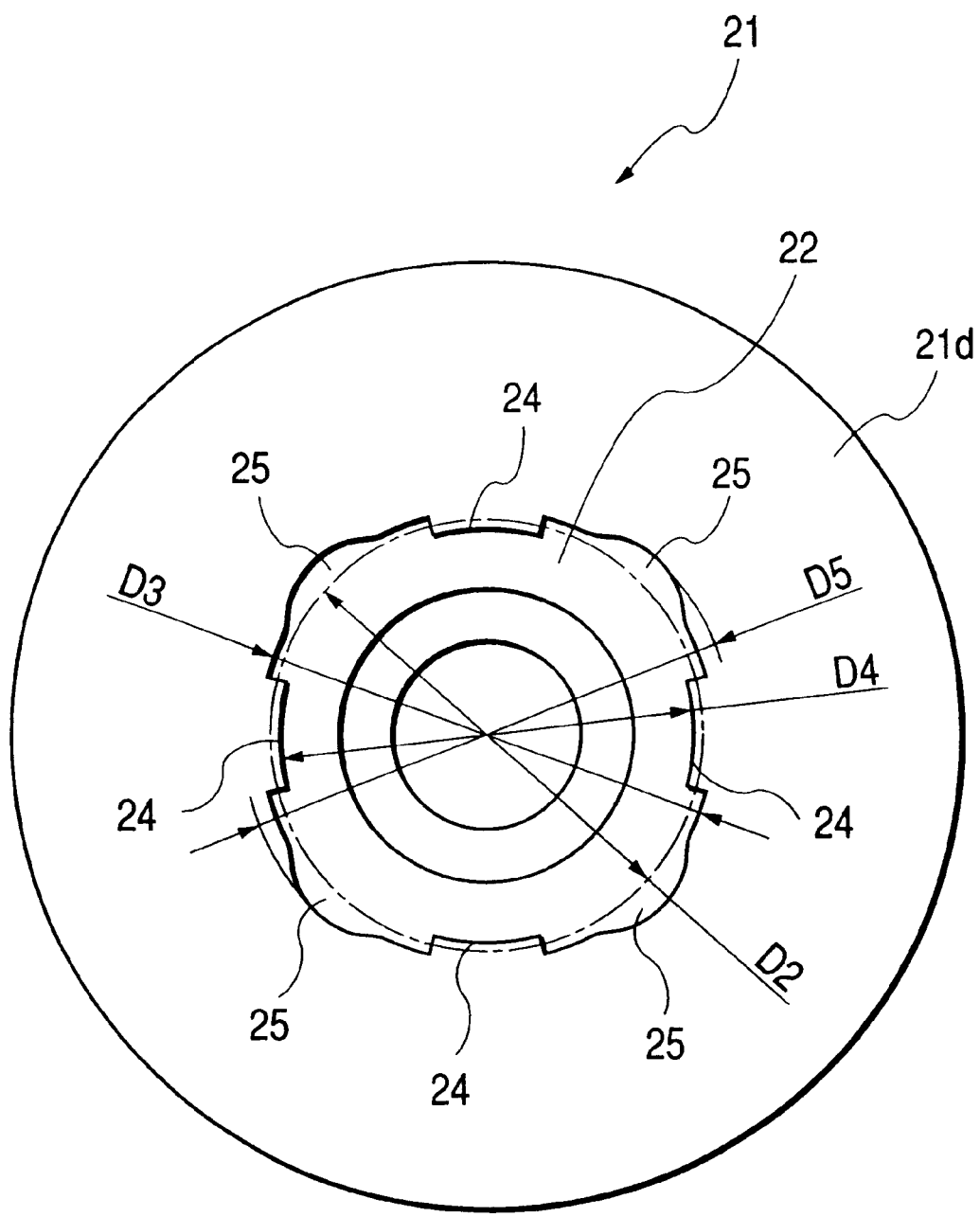
FIG. 2 is an enlarged view of one end (optical fiber inserting-side end) of the ferrule.

One preferred embodiment of the present invention will now be described with reference to the drawings. FIG. 1 shows one preferred embodiment of an optical fiber-fixing structure of a ferrule of the invention, showing a cross-sectional view of the ferrule and a plan view of an optical fiber. FIG. 2 is an enlarged view of one end (an optical fiber inserting end) of the ferrule.

An optical fiber shown in FIG. 1, is basically identical in construction to that in the conventional example, and therefore identical reference numerals denote identical portions, respectively, and detailed explanation thereof will be omitted.

In FIG. 1, a ferrule 21 for the optical fiber is molded of a synthetic resin, and this ferrule 21 includes a receiving portion 22, having a larger inner diameter, and a receiving portion 23 having a smaller inner diameter (i.e., the diameter is smaller than the inner diameter of the receiving portion 22). The receiving portion 22 extends from one end 21a of the ferrule beyond a central portion thereof toward the other end 21b thereof, and is coaxial with the ferrule 21. In other words, the receiving portion 22 extends more than halfway along the ferrule 21. The receiving portion 23 is stepped relative to that end of the receiving portion 22 which is disposed close to the other end 21b, in a direction perpendicular to the center axis of the ferrule 21, and extends from this step portion to the other end 21b in coaxial relation to the ferrule 21. The ferrule 21 has these receiving portions 22 and 23 formed therein, and therefore the ferrule 21 has a generally stepped, cylindrical outer shape.

As in the conventional construction, an annular flange 21c is formed on a generally central portion of an outer peripheral surface of the ferrule 21, and also an annular flange 21d is formed on this outer peripheral surface at the one end 21a, these flanges 21c and 21d projecting perpendicularly to the center axis of the ferrule. A tapering surface 21e is formed on the other end 21b.

Protuberances 24 and grooves 25 are provided at the inner surface of the receiving portion 22, and extend from the one end 21a to the step portion in parallel relation to the above center axis. A tapering portion 26 is formed at an edge of the bore of the receiving portion 22 (which is open to the one end 21a) over an entire circumference thereof, and is decreasing in diameter progressively toward the inside of the ferrule 21.

Figure 3:
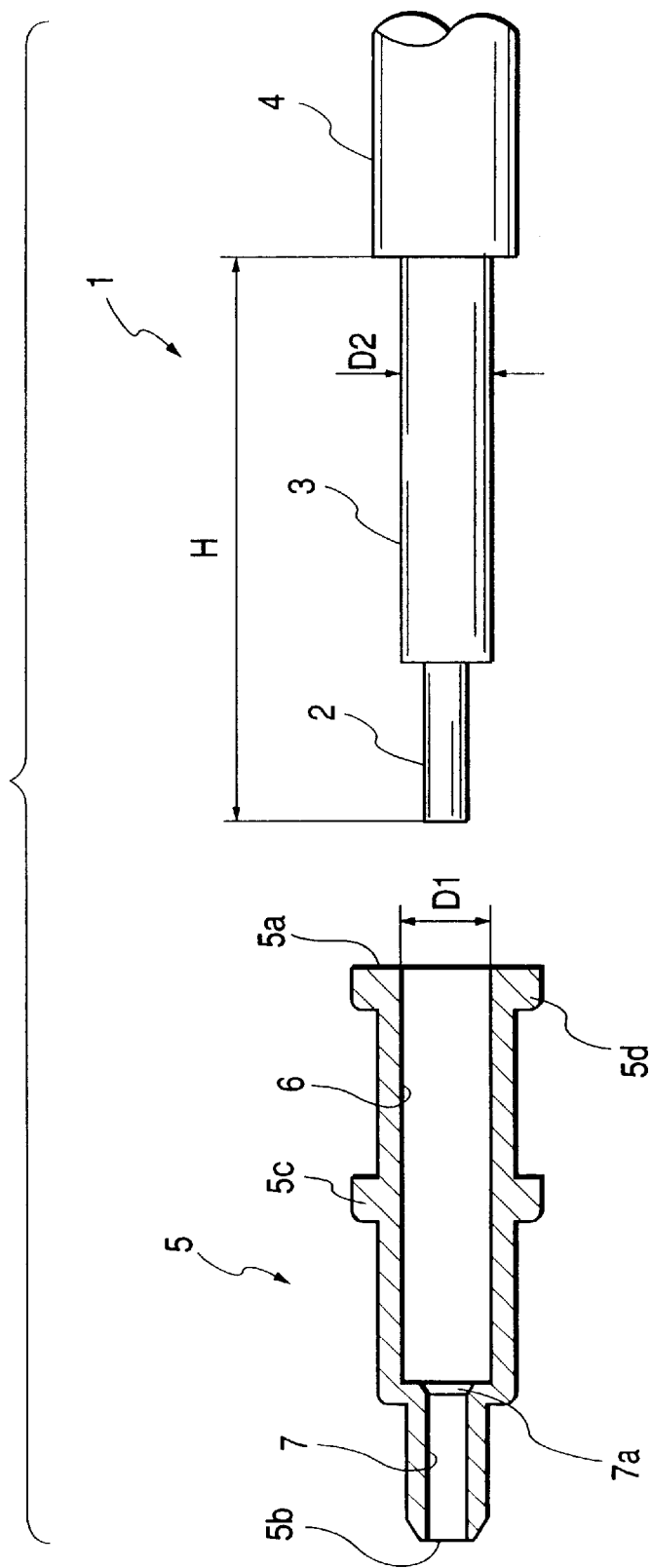
FIG. 3 shows a cross-sectional view of a conventional ferrule and a plan view of an optical fiber.
Figure 4:
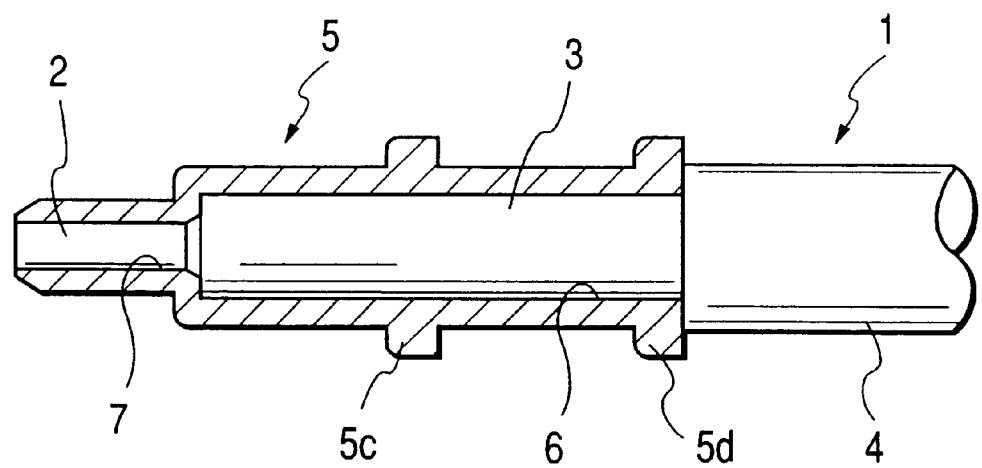
FIG. 4 is a view showing a condition in which the ferrule of FIG. 3 is fitted on the optical fiber.
Figure 5:
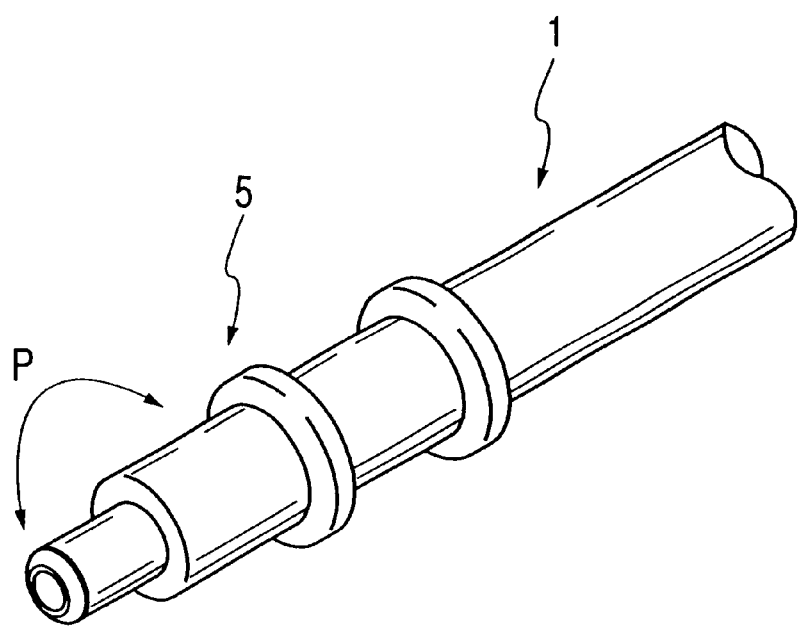
FIG. 5 is a perspective view of the structure of FIG. 4.

In FIG. 2, the inner diameter D3 (equal to the inner diameter D1 in FIG. 3) of the receiving portion 22 is slightly larger than an outer diameter D2 of a primary sheath 3 (see FIG. 1) of the optical fiber 1 so as to provide an insertion clearance for the primary sheath 3 as in the conventional construction.

In this embodiment, four protuberances 24 are provided. Two protuberances 24 are spaced vertically from each other (see FIG. 2) while the other two protuberances 24 are spaced horizontally from each other. The distal end of each protuberance 24 projects radially inwardly, and an arcuate surface is formed on this distal end.

An inner diameter D4, defined by the distal ends of the protuberances 24, is slightly smaller than the outer diameter D2.

In this embodiment, four grooves 25 are provided, and are spaced at equal intervals from one another, and each of these grooves 25 is inclined at an angle of 45 degrees relative to the vertical and horizontal directions (see FIG. 2). The bottom of the groove 25 is radially outwardly recessed. The groove 25 is provided between any two adjacent protuberances 24.

The groove 25 has a generally semi-circular cross-section, and a diameter D5, defined by the bottoms of the grooves 25, is larger than the sum of the inner diameter D3 and the insertion clearance (D3–D2).

As shown in FIG. 1, a tapering surface 23a for a conductor 2 of the optical fiber 1 is formed at the receiving portion 23, and extends from the step portion formed between the receiving portion 22 and the receiving portion 23. The inner diameter of the receiving portion 23 except the tapering surface 23a is generally equal to the outer diameter of the conductor 2 of the optical fiber 1, although a clearance for the conductor 2 is provided.

The length of the receiving portion 23 in the direction of the longitudinal axis thereof (i.e., along the center axis of the ferrule 21) is equal to the length of the exposed conductor 2.

A process of mounting the ferrule 21 of the above construction on the optical fiber 1 will now be described with reference to FIG. 1.

First, an adhesive (not shown) is coated on that portion (indicated by the range H in FIG. 3) of the optical fiber 1, extending from the distal end of the conductor 2 to a step portion between the primary and secondary sheaths 3 and 4, over an entire area thereof.

Then, the ferrule 21 is fitted onto the optical fiber 1, which is coated with the adhesive, through the one end 21a thereof. At this time, the distal end of the primary sheath 3 is easily guided to the protuberances 24 by the tapering portion 26.

Then, as the fitting of the ferrule 21 proceeds, the primary sheath 3 is radially inwardly compressed by the protuberances 24, and the adhesive (not shown), existing on the compressed portions of the primary sheath 3, while scraped therefrom, is formed into a thin film, and is interposed between the protuberances 24 and the primary sheath 3.

The adhesive, existing on those portions of the primary sheath compressed respectively by the protuberances 24, is solidified earlier than the adhesive existing on the other portions of the primary sheath, thereby enhancing the provisional-fixing effect.

Then, the adhesive, existing on those portions of the primary sheath compressed by the protuberances 24, and on their neighboring portions, are moved toward the grooves 25, and are gradually collected in the grooves 25.

Then, when the one end 21a is abutted against the secondary sheath 4, the fitting or mounting of the ferrule 21 on the optical fiber is complete, and the optical fiber 1 is provisionally fixed by the ferrule 21.

Finally, the adhesive (not shown) is solidified by air drying or forced drying, thus completing the bond-fixing of the optical fiber 1.

As described above with reference to FIGS. 1 and 2, when the ferrule 21 is fitted on the optical fiber 1, the protuberances 24 compress the primary sheath 3 of the optical fiber 1 radially inwardly, and therefore the ferrule 21 will not be displaced with respect to the optical fiber 1, and the stable bond-fixing can be effected.

Of course, it is not necessary to conduct a careful operation (which lowers the efficiency of the operation), as required in the conventional construction, before the bond-fixing between the ferrule 21 and the optical fiber 1 is completed.

Also, a check for the displacement of the ferrule 21 can be omitted or simplified.

The protuberances 24, provided at the receiving portion 22, extend in the direction of the center axis of the ferrule 21 (that is, in the direction of the axis of the receiving portion 22), and therefore the area of those portions, compressing the primary sheath 3 to provisionally hold the same, is large, and these protuberances positively prevent the displacement of the ferrule 21, and contribute to the enhancement of the operation efficiency.

Therefore, the above fixing structure can greatly enhance the efficiency of the operation required for fixing the optical fiber 1 and the ferrule 21 together.

Additionally, the number of the component parts is not increased, and therefore this structure is very advantageous not only in terms of the operation efficiency but also in terms of the cost.

The grooves 25 are formed at the receiving portion 22, and extend in the direction of the axis thereof (that is, in the direction of the center axis of the ferrule 21), and therefore the insertion clearance (D3–D2) for the optical fiber 1 is larger at these grooves 25 as compared with the conventional construction.

The grooves 25 have a generally semi-circular cross-section as viewed in a direction perpendicular to the above axis, and therefore the above adhesive (not shown) can be distributed uniformly over the entire area of each groove 25 regardless of the viscosity of the adhesive.

At this time, any fresh air layer will not be produced, and therefore the ferrule 21 and the optical fiber 1 can be bonded and fixed together more satisfactorily.

Because of the provision of the protuberances 24, the adhesive (not shown), existing on those portions of the primary sheath, compressed by the protuberances 24, and on their neighboring portions, are moved toward the grooves 25. As a result, the air (bubbles), included in the adhesive (not shown), gather to form a large lump of the air, and the air can easily escape to the exterior partly under the influence of its buoyancy. Therefore, the air can be removed without effecting the very cumbersome operation as required in the conventional construction, and the efficiency of the operation can be markedly enhanced.

With respect to the air removal, the number of the component parts is not increased, and therefore this structure is very advantageous not only from the viewpoint of the operation efficiency but also from the viewpoint of the cost.

Various modifications can be made without changing the subject matter of the present invention.

For example, the number of the protuberances 24 is not limited to 4, and at least two (and an integral multiple of 2) protuberances 24 can be provided in diametrically-opposite positions in view of the stability.

Each of the protuberances 24 can be in the form of a rib having a generally semi-circular cross-section.

Also, the jacket of the optical fiber 1, formed by the primary sheath 3 and the secondary sheath 4, may comprise only the primary sheath 3.

Furthermore, each of the grooves 25 can be slanting in such a manner that their depth is increasing progressively toward the one end 21a so that the air can be easily removed.

As described above, in the optical fiber-fixing structure of the ferrule, the ferrule is fitted on the optical fiber which has the conductor exposed from the sheath by end processing. The ferrule includes the larger inner-diameter and smaller inner-diameter receiving portions for respectively receiving the sheath and the conductor. The receiving portions extend continuously through the ferrule from one end thereof to the other end thereof. The ferrule is bonded and fixed to the optical fiber, and the protuberances are formed at the larger inner-diameter receiving portion, and the inner diameter, defined by the distal ends of the protuberances, is smaller than the diameter of the sheath, and the sheath is provisionally fixed relative to the larger inner-diameter receiving portion in a press-fitted condition.

In this optical fiber-fixing structure, when the ferrule is fitted on the optical fiber, the protuberances compress the sheath of the optical fiber radially inwardly, and therefore the ferrule will not be displaced with respect to the optical fiber, and the bond-fixing can be effected stably.

A careful operation (which lowers the efficiency of the operation), as required in the conventional construction before the bond-fixing between the ferrule and the optical fiber is completed, is not necessary. Also, a check for the displacement of the ferrule can be omitted or simplified.

Therefore, there is achieved an advantage that the above fixing structure can greatly enhance the efficiency of the operation required for fixing the optical fiber and the ferrule together.

Also, the number of the component parts is not increased, and therefore this structure is very advantageous not only from the viewpoint of the operation efficiency but also from the viewpoint of the cost.

The protuberances, formed at the larger inner-diameter receiving portion, extend in the direction of the axis of this receiving portion. Therefore, the area of those portions, compressing the sheath of the optical fiber to hold the same, is large, and therefore there is achieved the advantages that these protuberances positively prevent the displacement of the ferrule, and contribute to the enhancement of the operation efficiency.

The grooves are formed at the larger inner-diameter receiving portion, and extend in the direction of the axis of this receiving portion. When these grooves are formed, the clearance for the optical fiber is larger at these grooves as compared with the conventional construction. Because of the provision of the protuberances, the adhesive, existing on those portions of the sheath, compressed by the protuberances, and on their neighboring portions, are moved toward the grooves. As a result, the air (bubbles), included in the adhesive, gather to form a large lump of the air, and the air can easily escape to the exterior partly under the influence of its buoyancy.

Therefore, advantageously, the air can be removed without effecting the very cumbersome operation in which the ferrule, while rotated, is fitted on the optical fiber as in the conventional construction, and the efficiency of the operation can be markedly enhanced.

Also, the number of the component parts is not increased, and therefore this structure is very advantageous not only from the viewpoint of the operation efficiency but also from the viewpoint of the cost.

Each of the grooves, formed at the larger inner-diameter receiving portion, has a generally semi-circular cross-section as viewed in the direction perpendicular to the axis of this receiving portion.

With this configuration, there is achieved an advantage that the adhesive is distributed uniformly over the entire area of each groove regardless of the viscosity of the adhesive.

Therefore, any fresh air layer will not be produced when the adhesive flows into the grooves, and therefore there is achieved an advantage that the ferrule and the optical fiber can be bonded and fixed together more satisfactorily.

The tapering portion is formed at the edge of the bore of the larger inner-diameter receiving portion open to the one end of the ferrule, and is decreasing in diameter progressively from the one end toward the inside of the ferrule.

Therefore, the sheath of the optical fiber is guided to the protuberances by this tapering portion, and therefore there is achieved an advantage that the ferrule can be easily press-fitted on the optical fiber, and the efficiency of the operation is enhanced.

It will be apparent to those skilled in the art that various modifications and variations can be made in the manifold unit according to the present invention without departing from the spirit or scope of the invention. Thus, it is intended that the present invention cover the modifications and variations of the invention provided they come within the scope of the appended claims and their equivalents.

What is claimed is:

1. A ferrule having an optical fiber-fixing structure, wherein said ferrule is fitted on an optical fiber having a conductor exposed from a sheath by an end processing, said ferrule comprising:

a larger inner-diameter receiving portion and a smaller inner-diameter receiving portion for respectively receiving the sheath and the conductor, said receiving portions extending continuously through said ferrule from one end thereof to the other end thereof;

protuberances formed at said larger inner-diameter receiving portion, distal ends of said protuberances forming a second inner diameter which is smaller than a diameter of said sheath, for provisionally fixing said sheath to said larger inner-diameter receiving portion in a press-fitted condition.

2. The ferrule according to claim 1, wherein said protuberances extend along a direction of a central axis of said larger inner-diameter receiving portion.

3. The ferrule according to claim 1, wherein grooves are formed on said larger inner-diameter receiving portion, and extend along a direction of a central axis of said larger inner-diameter receiving portion.

4. The ferrule according to claim 3, wherein each of said grooves has an arcuate cross-section as viewed in a direction perpendicular to said axis.

5. The ferrule according to claim 1, wherein a tapering portion is formed on said larger inner-diameter receiving portion at said one end of said ferrule, and is decreasing in diameter along a direction from said one end toward said other end said ferrule.

* * * * *